April 17, 1928.  
J. A. HINGER ET AL  
1,666,449
FLUID PRESSURE CONTROL FOR PRESSES
Filed Feb. 6, 1925 3 Sheets-Sheet 2
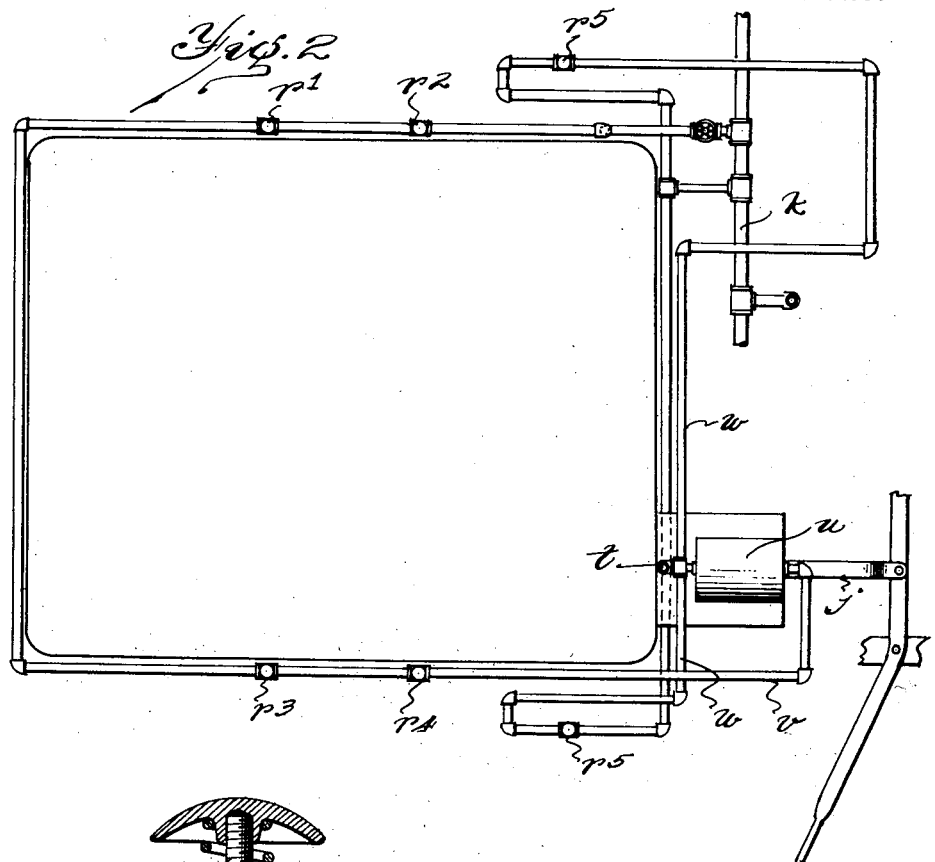
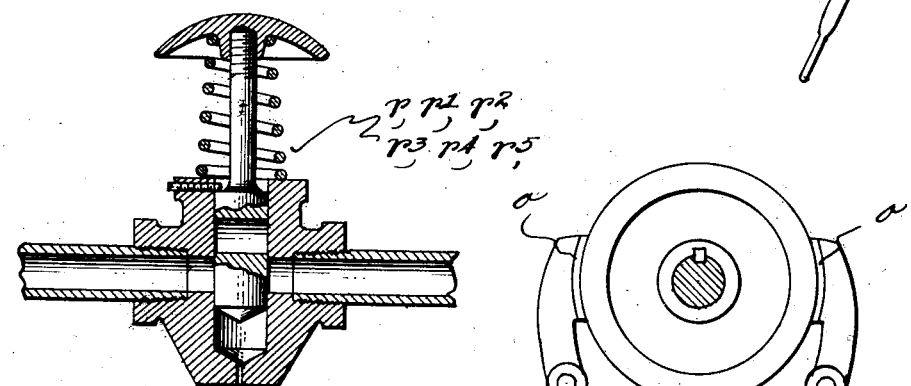
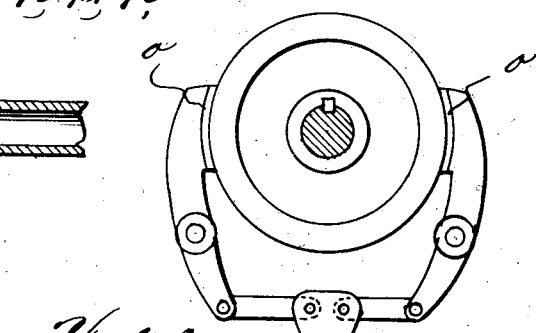
INVENTORS  
John A. Hinger  
David B. Mayer  
James Wilson  
BY  
ATTORNEY.

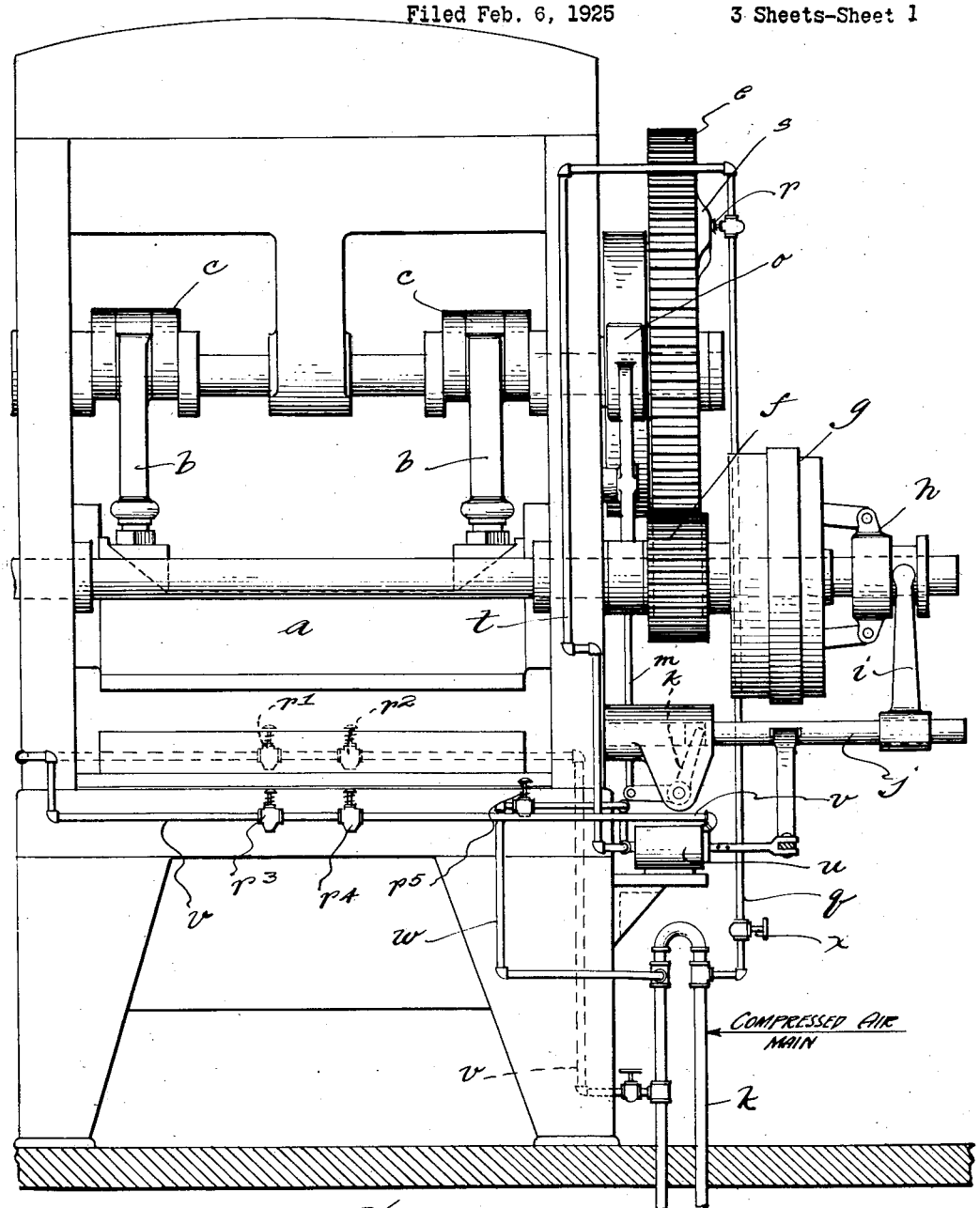

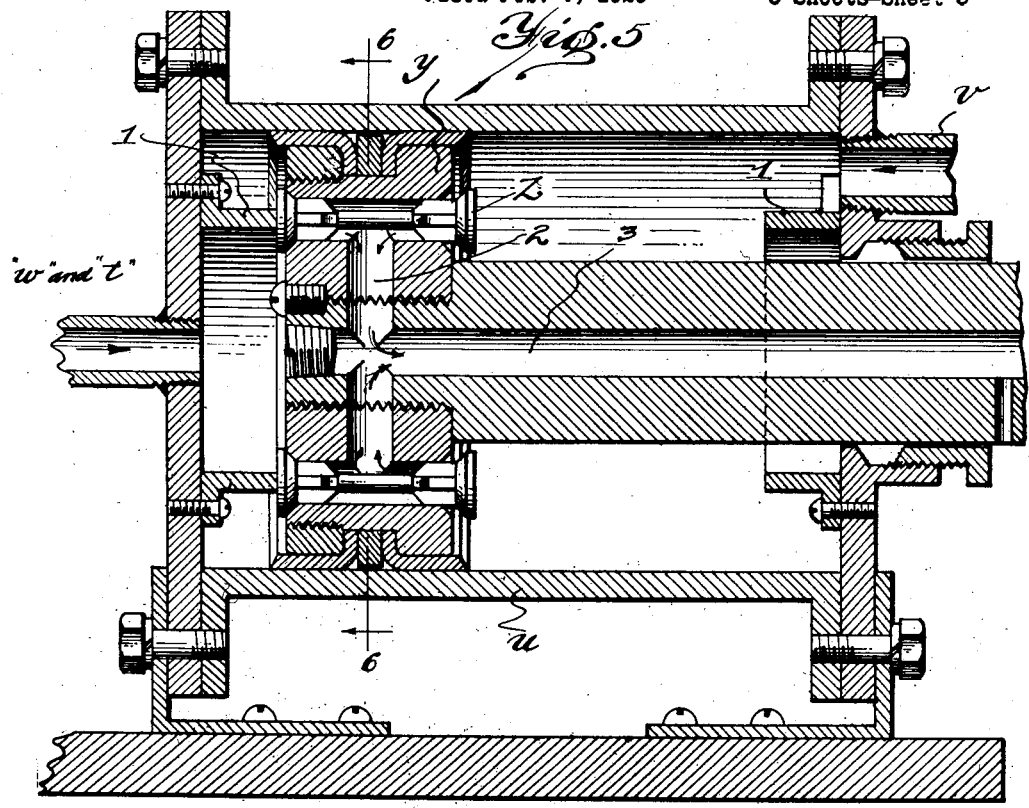
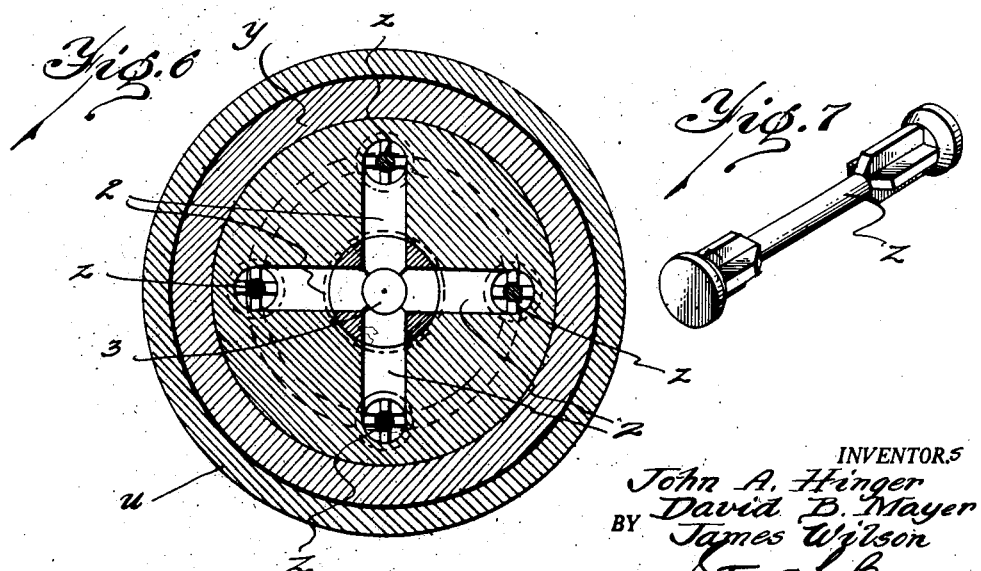

Patented Apr. 17, 1928.

1,666,449

UNITED STATES PATENT OFFICE.

JOHN A. HINGER, DAVID B. MAYER, AND JAMES WILSON, OF CLEVELAND, OHIO, ASSIGNORS, BY MESNE ASSIGNMENTS, TO GENERAL MOTORS CORPORATION, OF DETROIT, MICHIGAN, A CORPORATION OF DELAWARE.

FLUID-PRESSURE CONTROL FOR PRESSES.

Application filed February 6, 1925. Serial No. 7,234.

This invention relates to controls and presses. It is intended to afford a safety control, especially for the large crank and toggle presses used in large stamping operations.

In stamping large metal shapes it is customary to have a man on each side of the press to place the work and remove the work. It is the object of the present invention to provide a fluid pressure control which can trip the press only when both men have their hands out of the path of the ram. Furthermore, it provides an automatic stop device at each complete revolution. It also provides an emergency control at each side of the press for stopping the operation of the press.

In the drawings:

Fig. 1 is a front elevation of the large crank press equipped with my improved control.

Fig. 2 is a plan view of the control lay-out.

Fig. 3 shows one of the valves that can be used.

Fig. 4 is a detail of the brake.

Fig. 5 is a longitudinal cross section of the air cylinder.

Fig. 6 is a cross section of same, taken on the line 6—6 of Fig. 5.

Fig. 7 is a detail of one of the valves.

The various parts of the press require no detailed explanation. A ram $a$ is reciprocated up and down by the rods $b$ connected with the cranks $c$, which are revolved by the large gear wheel $e$, which is in turn driven by the pinion $f$. $g$ represents the clutch housing in which any suitable clutch of the disc or cone type can be located. The clutch collar $h$ is operated by the clutch shifting rod $i$ attached to the shaft $j$. There is further connected with this shaft $j$ a bell crank $k$ which has one end connected by a rod $m$ with the brake shoes $o$, (see Fig. 4). Just the character of the connections is unimportant. It is, however, usual and necessary in these presses to have some kind of a braking arrangement to prevent the overthrow of the press due to the momentum of the parts.

Our invention attaches to the shifting rod $j$, which can be considered as broadly controlling the starting and stopping of the press with or without the brake mechanism. It is customary to shift this rod with hand levers. It is the object of the present invention to use fluid power, preferably a pneumatic power for effecting this control, although hydraulic pressure might be used.

To this end, the press is provided with suitable pipe fittings and lines so as to provide a connection $k$ with a source of fluid under pressure. It will be seen that one fluid line $q$ leads off from this main and up near the large gear wheel, and is provided with any suitable form of spring controlled valve $r$, such as the valve shown in Fig. 3, and it will be seen that this is ordinarily closed and is only opened when depressed. However, let it be known that this is only one form of such a valve and numerous other forms can be used for this purpose. The purpose of this valve at this point is to be engaged by the cam $s$ on the gear wheel so as to admit fluid pressure in the pipe $t$ at the end of every revolution for the purpose of disengaging the clutch by letting fluid in the left hand side of the cylinder $u$ as will presently be described.

Another line from the fluid main designated $v$ leads clear around the press and has four of these same valves $r^1$, $r^2$, $r^3$ and $r^4$. It will be obvious that in order to admit air into the right end of the cylinder through this line, all of these four valves have to be opened at one time. They can only be opened at one time by the workmen on both sides of the press, having both hands on the valves at the same time. If such is the case, then it will be obvious that his hands are out of reach of the ram and the press may be safely operated. One man alone cannot trip the press nor either man with only one hand. Still a third branch line $w$ divides and leads to both sides of the press where on each side is located an emergency valve $r^5$. Hence, either workman by depressing this valve can apply fluid pressure to the left hand side of the cylinder to disengage the clutch and apply the brake, as we shall see.

Referring to the plan view, it will be seen that not only the two pipes $w$ go into the left hand side of the cylinder but also the pipe $t$. Hence, the press may be stopped by the emergency valve at either side of the press or by the automatic control valve that is operated once to every revolution, to wit,—the valve $r$. This valve $r$ however, may be easily put out of commission by shutting off the cut-off valve $x$, then the press will operate continuously until stopped by the emergency valve. As we have already seen, admission of pressure to the right of the cylinder from the pipe that requires operation of four valves sets the press in motion.

The construction of the cylinder which accomplishes this purpose is shown in Figs. 5, 6 and 7. The air entering the right hand side of the cylinder through the conduit $v$ will obviously shove the plunger $y$ to the left as shown. As it reaches the end of its movement, the sliding valves $z$ strike against the annular abutment 1. They are then pushed out as shown in Fig. 5; this permits the air to exhaust around the right hand ends of the valves and down through the passageways 2 to the center of the piston rod, where it passes through the passageway 3 to a point of exhaust.

Now the piston has been shifted completely to the left when it is exhausted. By a reference to Fig. 1, it will be seen that this shifts the shifting rod $j$ to the left and thereby applies the clutch and releases the brake shoes.

Now assuming that the air is let into the left hand side of the cylinder, obviously a fluid pressure on the piston forces it to the right until the valve $z$ strikes the other abutment 1, whereupon the same exhaust takes place. By the piston having completed its travel to the right, it has released the clutch and applied the brakes.

What we claim is:

1. A control for presses, having in combination with a press and a shifting member which starts and stops the press, of a fluid pressure system for controlling the shifting member, including a plurality of valves on opposite sides of said press and that require simultaneous actuation to start the press and including one or more emergency valves independent of said first mentioned valves and which may be actuated to stop the press at any time.

2. A control for presses, having in combination with a press and a shifting member which starts and stops the press, of a fluid pressure system for controlling the shifting member and including a plurality of valves on opposite sides of said press and which have to be operated to start the press, and an automatically controlled valve independently actuated and which when actuated causes said shifting member to move in a reverse direction for stopping the press at each revolution.

3. A control for presses, having in combination with a press and a shifting member which starts and stops the press, of a fluid pressure system for controlling the shifting member to start and stop the press, including an automatically tripped valve for causing a reverse movement of said shifting member to stop the press at each revolution.

4. A control for presses having a combination with a press and a shifting member which starts and stops the press, of a fluid pressure system for controlling the shifting member to start and stop the press including an automatic tripping valve for stopping the press at the end of each revolution, means for cutting out said automatic tripping valve to permit the continuous operation of the press, and an emergency valve for stopping the press at any time.

5. A control for presses, having in combination with a press and a shifting member which starts and stops the press, of a fluid pressure system for controlling the shifting member and which includes two pairs of relatively widely separated hand operated valves, said pairs of valves positioned on opposite sides of the press, and which require simultaneous actuation to start the press.

6. A control for presses, having in combination with a press and a shifting member which starts and stops the press, of a fluid pressure system for controlling the shifting member and which includes a plurality of valves arranged in pairs, each pair positioned on a different side of the press and which require simultaneous actuation to start the press.

In testimony whereof we have affixed our signatures.

JOHN A. HINGER.
DAVID B. MAYER.
JAMES WILSON.